United States Patent [19]

Genrich

[11] 3,767,101

[45] Oct. 23, 1973

[54] PULSE VIBRATOR FOR THERMOCOMPRESSION BONDING

[75] Inventor: William D. Genrich, Costa Mesa, Calif.

[73] Assignee: Hughes Aircraft Company, Culver City, Calif.

[22] Filed: Jan. 26, 1972

[21] Appl. No.: 221,015

[52] U.S. Cl. .......................... 228/1, 29/470, 29/626, 29/628, 228/5

[51] Int. Cl. .............................................. B23k 5/20

[58] Field of Search ...................... 228/1, 3, 4, 5, 6; 29/470, 470.1, 470.3, 472.9, 624, 626, 628; 219/85, 120, 221

[56] References Cited

UNITED STATES PATENTS

| | | | |
|---|---|---|---|
| 3,083,291 | 3/1963 | Soffa et al. | 219/85 X |
| 3,179,785 | 4/1965 | Belardi et al. | 29/472.9 |
| 3,357,090 | 12/1967 | Tiffany | 29/470 |
| 3,643,321 | 2/1972 | Field et al. | 29/470.1 |

*Primary Examiner*—J. Spencer Overholser
*Assistant Examiner*—Robert J. Craig
*Attorney*—W. H. MacAllister, Jr. et al.

[57] ABSTRACT

A standard thermocompression bonder is modified by the addition of a device which thumps the entire bonder including in particular a heated bonding capillary holding a wire lead and a device support holding the microcircuit to which the wire is to be bonded. The resulting brief damped vibration causes a scrubbing action between the wire tip and the circuit resulting in a superior thermocompression bond between them.

8 Claims, 12 Drawing Figures

PULSE VIBRATOR FOR THERMOCOMPRESSION BONDING

The present invention relates generally to the bonding of wire leads to microelectronic circuits and more particularly to an improvement in the technique of thermocompression bonding.

In fabricating electronic circuits of relatively great complexity the hybrid microelectronic circuit is often used. With this type of circuit several discrete active devices, each of the order of magnitude of 1/10th of an inch square are mounted on a single substrate upon which comductors have been deposited. Interconnection between the various discrete active devices and also connection from each of the devices to terminals on the substrate are made by attaching an extremely thin wire of the order of 1/1000th of an inch thick to minute terminals on the devices and connecting the opposite ends of the wire leads to the conductors deposited on the substrate. Several techniques are used for attaching the wires to the active devices, commonly referred to as chips. One of these methods is thermocompression bonding, whereby a ductile metal such as gold is pressed against a hard metal such as aluminum while one or both are heated. Although neither of the metals melts, the combination of pressure and elevated temperature results in a solid bond.

It has been known for some time that the quality of the bond obtained by thermocompression bonding can be improved by introducing a vibration between the two metals which are being bonded together. A thermocompression bonder which incorporates a low frequency vibrator is disclosed and claimed in Belardi et al, U.S. Pat. no. 3,179,785 assigned to the present assignee. Problems have been encountered, however, in making the vibratory technique operate satisfactorily when bonding gold to aluminum, particularly where pulsed thermo-compression bonding is used. In this type of bonding operation rather than to heat the gold wire before, during and after the bonding operation, it is first pressed into contact with the other, hard metal and is then heated by a very brief surge of current to make the bond. It is believed that with this type of operation, application of a constant vibration has the tendency of braking the bond after it has been made and after the surge of current has ceased and the metals have cooled. The reason for this problem will be understood when it is realized that the typical time duration for the heating current surge is of the order of half a second.

It is therefore a principal object of the present invention to improve the operation of thermocompression bonders. More particularly, it is an object of the present invention to provide an improved alternative to the use of oscillators for assisting in the operation of thermocompression bonders.

Yet another object of the present invention is to introduce a vibration between objects which are bonded together by thermocompression bonding so as to effect a scrubbing action between them before the bond is completed and to do so without subsequently destroying the bond as a result of that vibration. More specifically, it is an object of the invention to introduce a vibration of the aforesaid type which is of such a short duration that it diminishes to a negligible amount by the time the bond is complete.

In accordance with the present invention a very slight (of the order of 0.1 mil amplitude) vibration is introduced between a pair of members which are thermocompression bonded together and the vibration is tailored to diminish to a negligible amplitude by the time the bond has been completed. More specifically, as applied to a pulse-type thermocompression bonding machine wherein a microcircuit is mounted on a device support upon a base panel and wherein a malleable wire is fed through a pulse-heated capillary by means of which the wire is pressed against the microcircuit, the desired vibration is effected by "thumping" the base panel with a predetermined impact in a direction generally parallel to the surface of the base panel and transversely to the longitudinal axis of the malleable wire. This thumping has the effect of introducing a minute rapidly damped oscillation into both the support and the capillary through which the wire is advanced toward it. However, due to the different stiffness with which the capillary and the support are mounted upon the base panel, there will also result a relative vibratory damped movement between the capillary and the device support. As a result, when the wire is pressed against the microcircuit held upon the device support, a scrubbing action occurs between the wire and the microcircuit to which it is to be bonded and this scrubbing action ceases in time so that it will not break the bond once it has been made through the scrubbed surfaces.

In keeping with the present invention, the desired impact is effected by mounting a pulse vibrator or "thumper" on the base panel, with the design of the thumper being such as to provide the magnitude and suddenness of impact which will be sufficient to cause the desired vibrations to occur but which is not so large or so sudden as to bring about damaging vibrations or metal splattering. In accordance with a specific, preferred embodiment of the invention, the thumper includes a mass mounted slidably upon the base panel, means for moving the mass relative to the panel, means upon the panel to arrest the movement of the mass and to do so gradually so as to transfer the kinetic energy of the mass to the base panel over a predetermined length of time. The thumper disclosed herein includes a weight mounted slidably upon the base panel, a solenoid for initiating travel of the weight, a stopping member rigidly secured relative to the base panel in the path of the traveling weight, and a coil spring between the stopping member and the weight, the stiffness of the spring being selected to gradually bring the weight to a stop over a period of time which will result in the vibration between the bonded members having a frequency of the order of 10 to 30 cycles per second.

Other objects and features of the invention will become apparent from the following detailed description with reference to the drawings in which:

FIGS. 1*a*–1*g* is a sequential series of diagrams showing the manner in which thermocompression bonding is performed in accordance with the present invention;

Figures 1A, 1B, 1C, 1D, 1E, 1F, 1G:
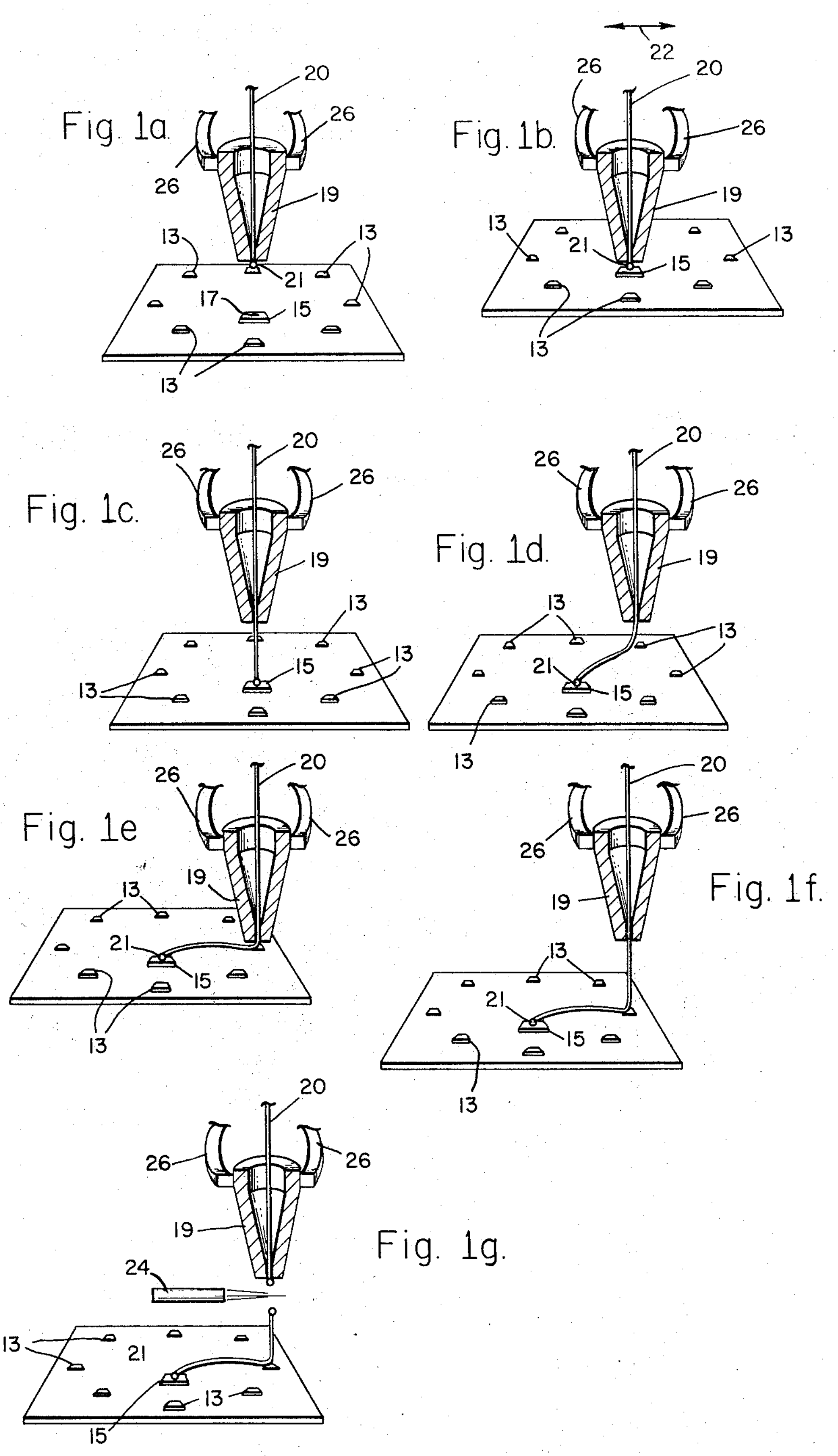

Turning now to the figures, a microcircuit fabricated by the use of thermocompression bonders is illustrated in the sequence of FIGS. 1*a*–1*g*. It includes a semiconducting substrate 11 on which various passive circuit components (not shown) are deposited and upon which there are also deposited a number of contact pads 13, the latter being in electrical contact with the deposited substrate components. Mounted on the substrate 11 are usually several active devices one of which 15 is shown. Operation of the thermocompression bonder will be described with reference to making of a bond between a wire lead and a contact 17 on the chip 15 which will usually lead to one of the active devices on the chip. Thermocompression bonders are usually of two types, continuously heated and pulse-heated. The present invention is applicable to both types but since it has been found particularly advantageous with the pulse-heated type of bonder it will be described with reference to it. The bonder includes a Tungsten carbide capillary 19 held between a pair of arms 26 through which a current is pulsed for a period of time usually between 300 and 800 milliseconds. A gold wire 20 having a thickness anywhere between 0.0007 inch to 0.002 inch and usually 0.001 inch is fed through the capillary 19. A ball 21 is formed at the end of the wire by a flame as seen in FIG. 1*g*. After the contact 17 has been precisely positioned under the tip of the capillary 19, the latter is lowered so as to press the wire ball 21 against the contact 17 to which it is to be bonded. The amount of pressure may be varied and will typically be of the order of 30 to 100 grams. The pulse-heated thermocompression bonder which is illustrated herein by way of example is commercially available from Hughes Aircraft Company, Welding Department, Oceanside, California, as the Model MCW/BB Micropulse Thermocompression Ball Bonding System. Its most pertinent parts are described in Hughes operation and maintenance manual for the Hughes Model MA-09-20 Ball Bonder Accessory, and for that reason will not be described in more detail than necessary to understand the application of the present invention to a bonding system of that type. For a fuller understanding of the principles underlying pulse-heated wire bonding reference may be made to "RECENT ADVANCES IN PULSE-HEATED WIRE BONDING FOR HYBRID MICROELECTRONICS" presented by W. H. Hill and G. D. Wrench to the National Electronic Packaging and Production Conference (NEPCON-EAST) June 6, 1968.

Continuing with this description of the manner in which a pulse-heated thermocompression bond is made in accordance with the invention, after the capillary 19 has been lowered so as to press the wire ball 21 against the contact 17, a current pulse is applied to the capillary 19 so as to rapidly heat it and the wire ball 21. Commencing with the application of the heating current to the capillary 19, a pulsed vibration generally in the plane of the substrate 11 is set up in the system, and represented by the arrow 22 in FIG. 1b with a preferred amplitude of excursion between the ball 21 and the contact 17 being of the order of 0.1 mil, at a frequency of the order of 10 cycles per second and a duration comparable to that of the current pulse applied to the capillary, typically of the order of 500 milliseconds. Usually the current pulse applied to the capillary 19 will not exceed one second, and since it is desirable that the induced vibration be damped to a negligible magnitude by the time the bond is completed, the vibrations will usually be damped to a negligible amount in a time not exceeding one second.

It has been found that the bond resulting when a damped vibration is used is clearly superior to that obtainable without the use of vibration and that satisfactory bonds can be obtained at lower capillary temperatures than otherwise, resulting in longer capillary lifetime.

The remaining steps illustrated in FIGS. 1*c–g* are the same as those carried out with conventional pulse-heated thermocompression bonding. Thus, the capillary 19 is raised after the completion of the bond (1*c*), the substrate 11 is moved so as to position one of the substrate contacts 13 under the capillary (FIG. 1*d*) after which the capillary is again brought down so as to press the wire down against that contact 13 (1e), at which time a current pulse is again applied to the capillary. The type of bond made during the step 1e is called a wedge bond because of the mechanism whereby the wire is wedged against the contact 13 by the rim of the capillary 19. This is in contrast with the ball type bond made during the step 1*b*. While the use of a pulsed vibration or thump during the wedge bonding step shown in FIG. 1*e* is permissible, it is not nearly as desirable as is the case during the ball bonding step 1*b*. This is so mainly because during the ball bonding step the wire is usually bonded to an aluminum contact 17 which is difficult to bond to because of the oxide which tends to form thereon. It is the scrubbing off of the aluminum oxide which is believed to account for the great improvement effected by the shock vibration of the present invention. In contrast the substrate contacts 13 to which the wire is attached by the wedge bonding step shown in FIG. 1e are usually made of gold and making the gold to gold bond between the wire 20 and the gold contact 13 is usually problem free.

After the wedge bond has been completed, the capillary 19 is again lifted (FIG. 1f) and, if no further connections are to be made to the contact 17, the wire 21 is cut by a thin hydrogen flame which is emitted from an orifice 24 mounted below the capillary.

Figure 5:
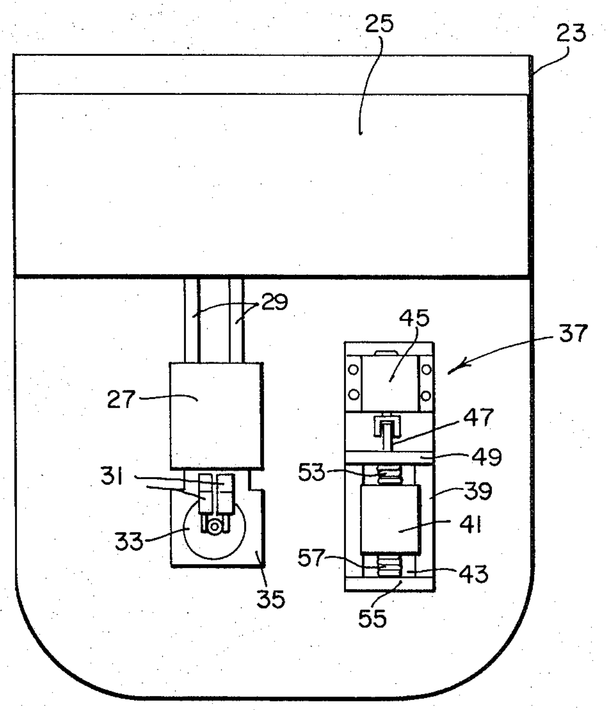
FIG. 5 is a plan view of a thermocompression bonder upon the base panel of which a thumper of the present invention has been mounted.
Figure 6:
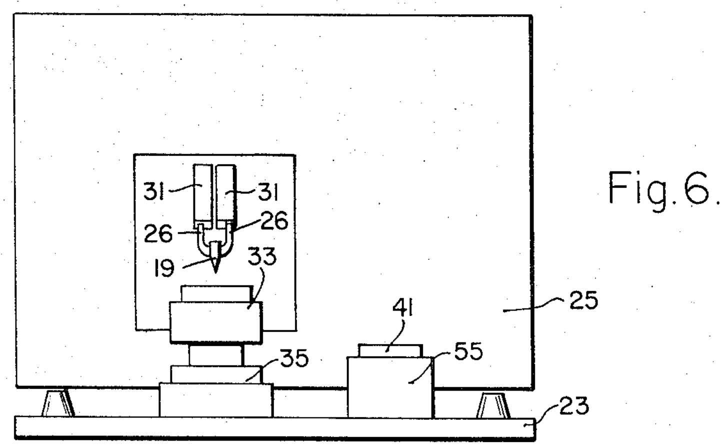
FIG. 6 is an elevation of the thermocompression bonder of FIG. 5.

Turning next to FIGS. 2–6, a suitable pulse vibrator or thumper will be described. Referring first to FIGS. 5 and 6 to illustrate the manner of mounting the pulse vibrator, they illustrate an exemplary pulsed thermocompression bonder such as the Hughes model referred to previously. It is seen to include a base panel 23 upon which the various parts of the system are bolted. These include a power supply 25, a weld head 27 connected to the power supply 25 through bus bars 29 and a pair of cantilevered beams 31 which extend from the weld head 27 and which hold the capillary 19. Heating current is applied from the power supply 25 through the bus bars 29 and through the cantilevered beams 31 to the capillary 19. Means are also provided in the weld head 27 for lowering the cantilevered beams 31 with a predetermined, variable force so as to bring about the necessary pressure between the tip of the capillary 19 and the object to which the wire being fed through the capillary is to be bonded. A pedestal-shaped device support 33 is mounted under the capillary 19, preferably upon an XY positioning device 35 as is done in the above referenced Hughes bonding system.

Figure 2:
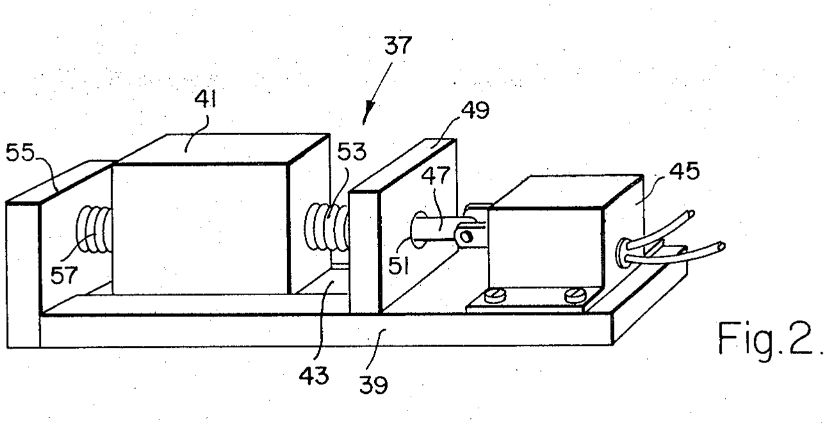
FIG. 2 is a perspective view of a thumper of the type used in accordance with the present invention to introduce a brief, damped vibration between the bonded elements.

In keeping with the present invention, a burst of vibration, or vibration pulse, is induced in the entire bonding system shown in FIGS. 5 and 6 by means of a pulse vibrator or thumper 37 illustrated therein and in FIG. 2. Disposed as shown in FIGS. 5 and 6 the thumper in its preferred illustrated embodiment includes a base 39 bolted to the base panel 23 of the system and slidably supporting a weight 41 in a grooved track 43. Bolted at one end of the base 23 is a solenoid 45 connected to the weight 41 through a plunger 47. When the solenoid 45 is actuated, it pulls upon the plunger 47 and moves the weight 41 toward the right as seen in FIG. 2. Forward movement of the weight 41 (toward the solenoid) is limited by a first stop member 49 also rigidly anchored upon the thumper base plate 39. The plunger 47 extends through an opening 51 in the stop member 49 and a cushioning spring 53 rides on that portion of the plunger 47 which is between the weight 41 and the stopping member 49. After hitting the spring 53 as a result of actuation of the plunger 45 the weight will bounce toward the left as seen in FIG. 2 and to arrest its rearward motion a second stopping member 55 is mounted in its rearward path, being bolted to the base plate 39. Disposed between the rear stopping member 55 and the weight 41 is an arresting spring 57 whose function is to bring the weight substantially to a stop or at least to reduce its subsequent bounce against the forward cushioning spring 53 to an insignificant amount so as to induce only a single shock in response to actuation of the solenoid 45.

When used with the Hughes bonder referred to hereinabove, a steel block 3 inches × 1 inch × 2 inches has been found suitable for the weight 41. A 1 inch long, ½ inch diameter compression spring having a spring constant of approximately 25 pounds per inch of deflection was used as the cushioning spring 53 and a considerably weaker or softer compression spring was employed for the arresting spring 57. The solenoid 45 was a Guardian Model 14C and the current pulse for energizing it was approximately 20 milliseconds in duration.

Figure 3:
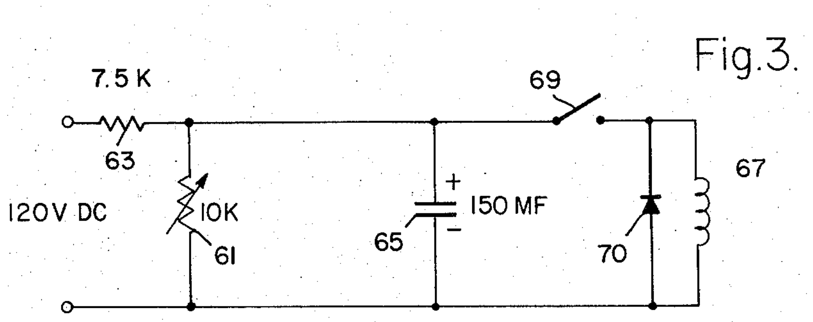
FIG. 3 is a suitable capacitive discharge circuit for actuating a solenoid whereby a weight may be traversed upon the base panel of a thermocompression bonder.
Figure 4:
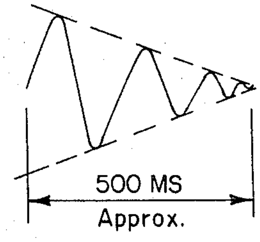
FIG. 4 is a waveform illustrating the approximate amplitude and frequency of the oscillations effected by the thumper of FIG. 2 between the bonded elements.

FIG. 3 illustrates a circuit suitable for driving the solenoid in the desired manner. It includes a voltage divider consisting of a variable 10K resistor 61 connected in series with a 7.5K resistor 63 across a 120 volt DC power supply. A 150 MF charging capacitor 65 is connected across the variable resistor 61, and the coil 67 of the solenoid 65 is connected through a switch 69 across the charging capacitor 65. To actuate the solenoid 45 the switch 69 is closed and the capacitor 65 which is normally charged to approximately 60 volts DC through the resistor 63 discharges through the solenoid coil 67, causing the weight 41 to travel quickly toward the right as seen in FIG. 2 or toward the power supply as seen in FIGS. 5 and 6. A diode 70 across the solenoid coil 67 insures that the solenoid 65 is not actuated by the collapsing field after initial actuation of the solenoid. The weight 41 would decelerate as it begins to compress the cushioning spring 53, causing its kinetic energy to be transferred to the system through the base panel 23, thereby causing the system to vibrate for a brief period of time, typically 500 milliseconds, its oscillations damping out in the manner illustrated in FIG. 3.

It will be apparent that the particular means illustrated for introducing the damped oscillation into the system whereby the desired scrubbing action occurs between the ball tip of the wire 20 and the microcircuit to which that wire is bonded is not the only way for bringing such an oscillation about. It will also be understood that the size of the sliding weight 41 and the strength of the weight cushioning spring 53 were selected so as to "tune" the thumper of FIG. 2 to the rest of the system as determined mainly by the mass of that system. Thus, were the remainder of the bonding system to have a smaller mass, the size of the weight 41 and the strength of the springs employed would be selected accordingly.

What is claimed is:

1. A thermocompression bonder comprising in combination:

a. a base;
b. means on said base for holding a microcircuit in position, said microcircuit having a metal contact thereon;
c. a bonding tip;
d. means on said base for pressing a wire by means of said bonding tip against the metal contact on said microcircuit while heating said wire through said bonding tip to a temperature where a thermocompression bond will result between it and said metal contact; and
e. means for inducing a burst of damped subsonic movement between said wire and said contact wherein each vibratory damped movement is smaller than the preceding such movement.

2. A thermocompression bonder in accordance with claim 1 characterized further in that said means is mounted upon said base and is operative to apply a non-recurring impulse of predetermined strength to said base and through said base to both said tip and said holding means.

3. A thermocompression bonder comprising in combination:

a. a base;
b. means on said base for holding a microcircuit in position, said microcircuit having a metal contact thereon;
c. a bonding tip;
d. means on said base for pressing a wire by means of said bonding tip against the metal contact on said microcircuit while heating said wire through said bonding tip to a temperature where a thermocompression bond will result between it and said metal contact; and
e. a weight movably mounted upon said base, a solenoid connected to move said weight in response to energizing current, means for applying a current pulse to said solenoid so as to move said weight, and means for gradually stopping said weight and transferring its kinetic energy to said base.

4. An improved ball bonder comprising:

a. a support panel;
b. means attached to said panel for securing a microcircuit in place;
c. a capillary and means for holding it upon said panel above said securing means;
d. a wire extending through said capillary;
e. means for forming a ball at the end of said wire;

f. means for lowering said capillary so as to cause its tip to press said ball against said microcircuit;
g. means for heating said ball while it is being pressed against said microcircuit; and
h. means mounted upon said panel for introducing a damped, progressively diminishing subsonic vibratory movement of less than one second's duration between said wire ball and said microcircuit while the ball is being heated and pressed.

5. An improved ball bonder comprising:
a. a support panel;
b. means attached to said panel for securing a microcircuit in place;
c. a capillary and means for holding it upon said panel above said securing means;
d. a wire extending through said capillary;
e. means for forming a ball at the end of said wire;
f. means for lowering said capillary so as to cause its tip to press said ball against said microcircuit;
g. means for heating said ball while it is being pressed against said microcircuit; and
h. a weight movably mounted upon said support panel, a solenoid connected to move said weight in response to energizing current, means for applying a current pulse to said solenoid so as to move said weight, and means for gradually stopping said weight and transferring its kinetic energy to said panel.

6. The ball bonder of claim 5 characterized further in that said weight is slidably mounted upon said panel and in that said means for transferring its kinetic energy includes a stop plate rigidly anchored upon said panel in the path of said weight and a spring between said stop plate and said weight.

7. In a ball bonder having a pedestal mounted upon a base panel to hold a mircocircuit stationary relative to said panel, a capillary mounted on said base panel above said pedestal with means being provided to feed wire through the capillary, to form a ball at the tip of the wire, to heat the wire ball through the capillary and to press the heated wire ball by means of the capillary against the microcircuit the improvement comprising in combination:

a weight movably mounted upon said base panel, a solenoid connected to move said weight in response to energizing current, means for applying a current pulse to said solenoid so as to move said weight, and means for gradually stopping said weight and transferring its kinetic energy to said panel.

8. The combination of claim 7 characterized further in that said weight is slidably mounted upon said panel and said means for transferring its kinetic energy includes a stopping member rigidly anchored upon said panel in the path of said weight and a spring positioned to cushion the impact of said weight against said stopping member.

* * * * *